April 24, 1934.  F. C. BLANCHARD  1,956,522
LATHE DRIVING MECHANISM
Filed July 15, 1930  2 Sheets-Sheet 1
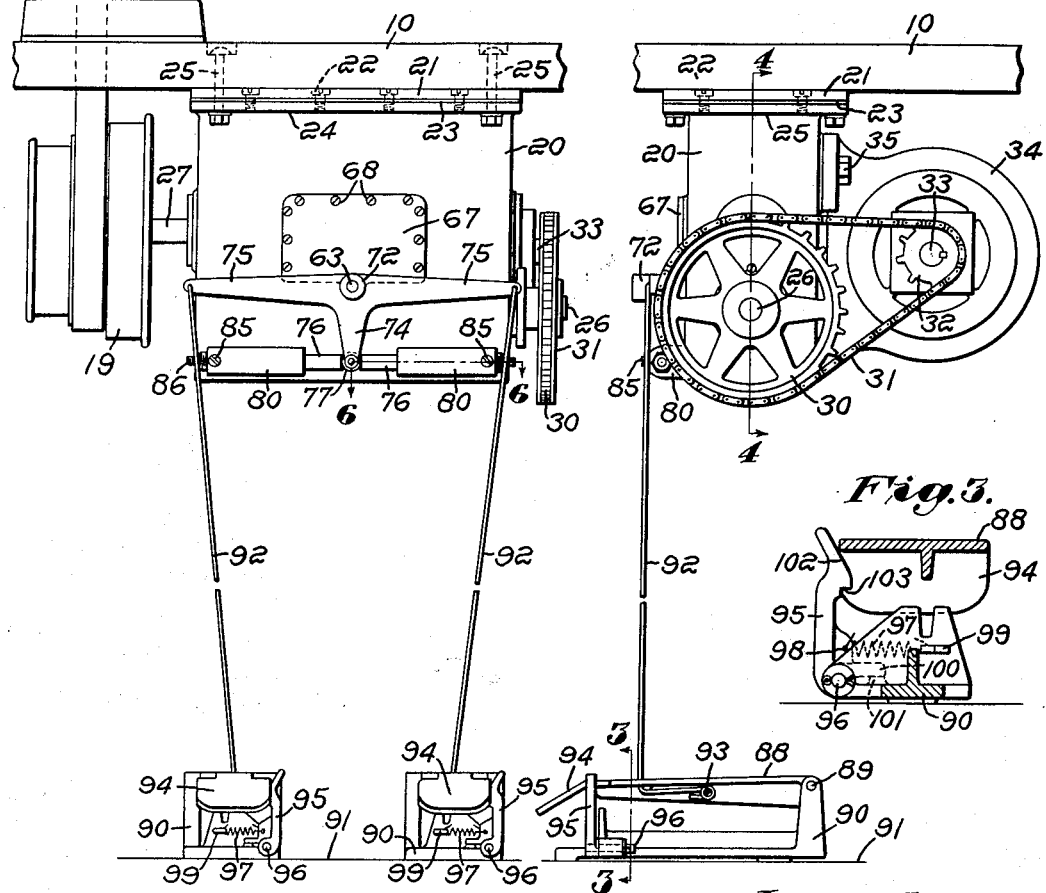

April 24, 1934.　　　F. C. BLANCHARD　　　1,956,522
LATHE DRIVING MECHANISM
Filed July 15, 1930　　　2 Sheets-Sheet 2
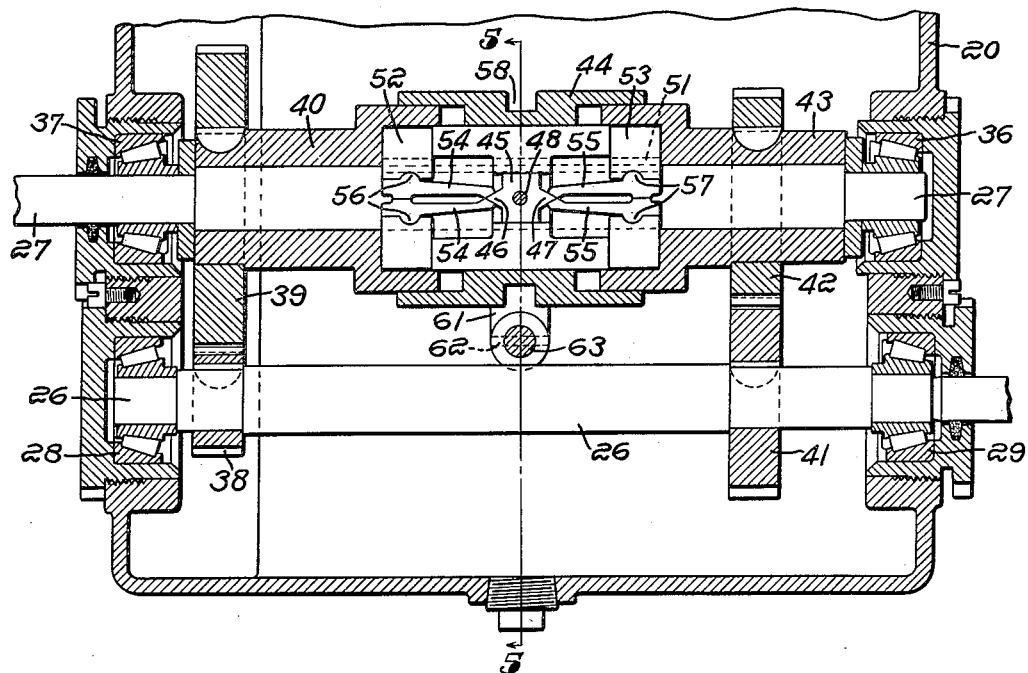
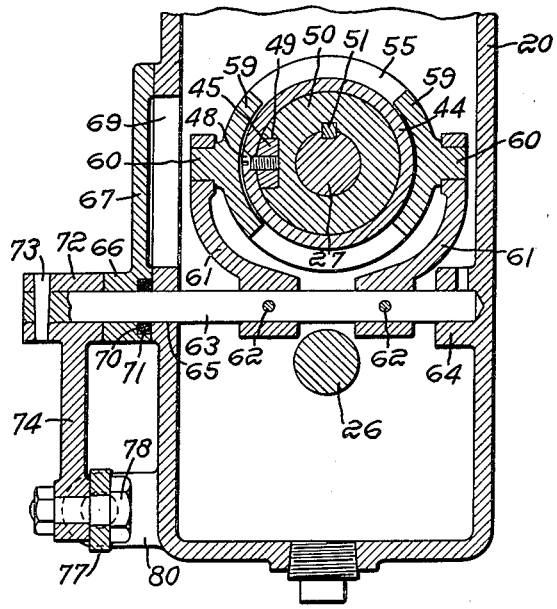
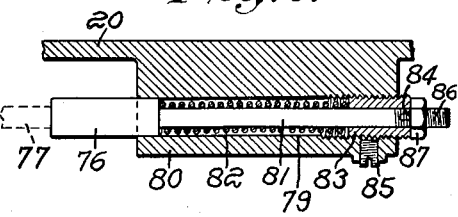
Inventor:
Frederick C. Blanchard,
by Emery, Booth, Varney & Townsend
Att'ys.

Patented Apr. 24, 1934

1,956,522

UNITED STATES PATENT OFFICE 1,956,522

LATHE DRIVING MECHANISM

Frederick C. Blanchard, Boston, Mass., assignor to Rivett Lathe & Grinder Corporation, Boston, Mass., a corporation of Massachusetts Application July 15, 1930, Serial No. 468,065

5 Claims. (Cl. 82—6)

This invention relates to a novel and improved mechanism for driving bench lathes, and will best be understood by reference to the following description, when taken in connection with the accompanying drawings of one specific embodiment thereof, while its scope will be pointed out more particularly in the appended claims.

In the drawings:

Fig. 1 is a front elevation of a bench lathe having a driving mechanism exemplifying the invention;

Fig. 2 is a side elevation of a portion of the same;

Fig. 3 is a sectional view at an enlarged scale on line 3—3 of Fig. 2;

Fig. 4 is a sectional view at an enlarged scale on line 4—4 of Fig. 2;

Fig. 5 is a sectional view on line 5—5 of Fig. 4; and

Fig. 6 is a sectional view, at an enlarged scale, on line 6—6 of Fig. 1.

Referring to the drawings, and to the embodiment of the invention which is illustrated therein, there is shown in Fig. 1 a bench 10, upon which there is mounted a lathe 11, comprising a bed 12 supporting a head-stock 13, presenting bearings 14 and 15 for a spindle 16, to which there is secured a cone pulley 17. The pulley is driven by a belt 18, which extends in a downward direction through the bench 10, and is driven by a cone pulley 19.

A clutch and transmission housing 20 is provided with a cover-plate 21 secured thereto as by fillister-head screws 22, whose heads are received in counter-bores in the cover-plate, and there is a gasket 23 between the cover-plate and a flange 24 presented by the housing. The housing is suitably secured to the under side of the bench, as by several bolts 25.

Referring now to Fig. 4, the housing contains a driving shaft 26 and a driven shaft 27. The driving shaft is mounted in suitable bearings, such as the roller bearings 28 and 29, and said shaft, as viewed from the front of the lathe, projects from the housing at the right-hand end of the latter. Power is furnished to the driving shaft, as by a sprocket wheel 30 (see Fig. 2), secured to the projecting end of the driving shaft, and connected by a chain 31 to a sprocket wheel 32, which is secured to and driven by a shaft 33 of an electric motor 34, the latter being secured, as by cap-screws 35, to the rear face of the housing 20.

Returning now to Fig. 4, the driven shaft 27 is mounted in suitable bearings, such as roller bearings 36 and 37, and projects from the left-hand end of the housing 20, as viewed from the front end of the lathe. The cone pulley 19 shown in Fig. 1 is secured to this projecting end of the shaft.

To provide two different speeds for the lathe, there are two sets of gears continuously driven by the driving shaft 26. The low speed is furnished by a pinion 38 keyed to the driving shaft 26, and meshing with a gear 39 keyed to a clutch sleeve 40, which is loosely mounted on the driven shaft 27. The high speed is furnished by a gear 41, keyed to the driving shaft 26, and meshing with a gear 42, which is keyed to a clutch sleeve 43, loosely mounted on the driven shaft 27. The clutch employed in the present example is a commercially known clutch called "The Johnson Double Clutch," and comprises in addition to the sleeves 40 and 43 an axially shiftable sleeve 44, which overlaps the sleeves 40 and 43. The sleeve 44 carries a wedge block 45, presenting wedges 46 and 47, and this block is suitably secured, as by a screw 48, to the sleeve 44. The wedge block 45 is loosely received in and guided by a longitudinal keyway 49 in a sleeve 50 (see Fig. 5), which is keyed to the shaft 27 by a key 51, which also keys two expansible split rings 52 and 53 (see Fig. 4) to said shaft. The wedge 46 is received between adjacent ends of a pair of clutch fingers 54, and the wedge 47 is received between adjacent ends of a pair of clutch fingers 55. The clutch fingers 54 are provided with protuberances 56, which afford fulcrums mounted in the expansible and contractible ring 52, and the clutch fingers 55 are provided with similar protuberances 57, similarly related to the expansible and contractible ring 53. When the axially shiftable sleeve 44 is in its neutral position, represented in Fig. 4, neither clutch is engaged, but when either of the rings 52 and 53 is expanded into engagement with the internal surface of the associated sleeve 40 or 43, as the case may be, one sleeve or the other is coupled to and drives the shaft 27.

The shifting of the sleeve 44 is accomplished by providing the latter with a circumferential groove 58, which, as shown in Fig. 4, receives a pair of segmental blocks 59 (see Fig. 5), having trunnions 60, pivotally mounted in arms 61, which are secured, as by pins 62, to a rockshaft 63. The rear end of the rockshaft 63 is received in a bearing 64, presented by the housing 20, while the front end of the shaft extends through a bearing 65 presented by the housing, and through a boss 66 presented by an inspection plate 67, which, as shown in Fig. 1, is secured to the front face of the housing by screws 68. Removal of these screws enables the inspection plate to be swung about the rockshaft to expose an opening 69 in the front face of the housing. This affords access to the clutches to enable the latter to be adjusted.

It is intended that the housing shall contain a bath of oil for the lubrication of the clutches, the gearing and the bearings. Leakage of oil from the housing outward along the rockshaft 63 is conveniently prevented by providing the inspection plate 67 with a recess 70 to receive a felt washer 71, encircling the rockshaft.

A lever 72, suitably secured as by a pin 73 to the front end of the rockshaft, is provided with a downwardly-directed arm 74, and two laterally-directed arms 75 (see Fig. 1). This lever is normally maintained in its neutral position, and is restored thereto by spring-pressed plungers 76, which engage opposite sides of a roller 77, best shown in Fig. 5, mounted on a stud 78 on the arm 74. Each of the plungers 76 is mounted to slide horizontally in a cylindrical bore 79, presented by a guide 80 projecting from the front face of the housing 20. Each plunger is provided with a reduced portion 81, which is encircled by a helically-coiled compression spring 82, interposed between the plunger head and a bushing 83, which is threaded into the guide 80 and affords means of adjustment for the spring. By proper adjustment of the two springs, the neutral position of the lever 72 is determined. The outer end of the spring-adjusting bushing is provided with a screw-driver slot 84, by means of which the bushing may be turned. After the desired adjustment has been obtained, a set-screw 85 maintains the adjustment. Outward movement of the plunger under the influence of the spring 82 is conveniently limited by providing the reduced portion of the plunger with a screw-thread 86 to receive a nut 87, which normally bears against the outer end of the spring-adjusting bushing 83.

The clutch-operating lever 72 is conveniently operated by two treadles 88 (see Figs. 1 and 2) mounted on pivots 89 on bases 90, which are to be secured to a floor represented by a line 91 in Figs. 1 and 2. These treadles are connected to the arms 75, respectively, of the clutch operating lever, as by cables 92, suitably secured as by screws 93 to their respective treadles. Each treadle is normally held in its elevated position shown in the drawings by one of the spring-pressed plungers 76. Each treadle has a forwardly and downwardly sloping portion 94, upon which the fore part of the operator's foot may be placed, while the heel remains upon the floor. This enables the operator's weight to be sustained by both feet, when either treadle is to be operated.

It should be understood, of course, that only one treadle is operated at a time, and that the depression of one treadle causes the engagement of one clutch to the exclusion of the other. When the left-hand treadle is depressed, the low speed clutch is engaged, and when the right-hand treadle is depressed, the high speed clutch is engaged. To enable either treadle to be locked in its depressed position, thereby to maintain engagement of the corresponding clutch, there is associated with each treadle appropriate means, herein a latch 95, best shown in Fig. 3, mounted on a pivot 96, and adapted to be moved laterally by sidewise movement of the fore part of the operator's foot. This latch is normally maintained in the position shown in Fig. 3 by an appropriate spring, such as a helically-coiled pull-spring 97, one end of which is secured to the latch as at 98, and the other to the base 90 as by a cotter pin 99. Movement of the latch under the influence of the spring is conveniently limited by providing the latch with a short, horizontal arm 100, normally engaging a stop 101, presented by the base 90.

When the treadle is depressed, its edge engages an inclined surface 102, presented by the latch, and the latter consequently is swung laterally in opposition to the pull of the spring. When the treadle is fully depressed, the spring restores the latch to its normal upright position, and a locking shoulder 103, presented by the latch, rides over upon the upper surface of the treadle and locks the latter. When the operator wishes to disengage the clutch, he simply swings the fore part of his foot laterally against the latch, and throws the latter out of engagement with the treadle, which then rises under the influence of the associated clutch-disengaging spring 82.

From the foregoing description, it will be apparent that I have provided a lathe driving mechanism which enables either of two speeds to be availed of without requiring the use of the operator's hands, thus enabling him to accomplish the work rapidly, and with a saving of time, as compared with former methods of speed control. Moreover, the controlling means is such that it has no tiresome effect on the operator, because the weight of his body can always be sustained by both feet, and because by simply depressing the proper treadle, the desired speed is availed of, and the engagement of the clutch is maintained without effort on the part of the operator. Yet the clutch may be disengaged by simply releasing the latch from the treadle.

Having thus described one embodiment of the invention, but without limiting myself thereto, what I claim and desire by Letters Patent to secure is:

1. In a lathe driving mechanism, the combination of a housing constructed for attachment to a support underlying the lathe, parallel driving and driven shafts within said housing, said driving shaft projecting from the right-hand end of said housing and said driven shaft projecting from the left-hand end of said housing as viewed from the front, a power-transmitting member on the left hand end of said driven shaft for driving the lathe a motor supported by and at the rear of said housing parallel with said shafts, driving mechanism connecting said motor to the projecting end of said driving shaft, and a change speed mechanism within said housing to connect said driving shaft to said driven shaft.

2. In a lathe driving mechanism, the combination of a housing constructed for attachment to a support underlying the lathe, parallel driving and driven shafts within said housing, said driving shaft projecting from the right-hand end of said housing and said driven shaft projecting from the left-hand end of said housing as viewed from the front, a power-transmitting member on the left-hand end of said driven shaft for driving the lathe a motor supported by and at the rear of said housing parallel with said shafts, driving mechanism connecting said motor to the projecting end of said driving shaft, a change-speed mechanism within said housing to connect said driving shaft to said driven shaft, and a change-speed lever supported by and at the front of said housing.

3. In a lathe driving mechanism, the combination of a housing constructed for attachment to a support underlying the lathe, parallel driving and driven shafts within said housing, said driving shaft projecting from the right-hand end of said housing and said driven shaft projecting from the left-hand end of said housing as viewed from the front, a power-transmitting member on the left hand end of said driven shaft for driving the lathe a motor supported by and at the rear of said housing, speed-reducing, driving mechanism connecting said motor to said driving shaft, and a change-speed mechanism within said housing to connect said driving and driven shafts in different ratios.

4. The combination with a lathe support, of a housing disposed beneath and supported by said support, parallel driving and driven shafts within said housing, said driven shaft projecting from the left hand end of said housing as viewed from the front, a power-transmitting member on the left hand end of said driven shaft to drive the lathe, a motor supported by and at the rear of said housing, driving mechanism connecting said motor to said driving shaft, and a change-speed mechanism within said housing to connect said driving shaft to said driven shaft.

5. The combination of a support for a lathe bed, a housing disposed beneath and supported by said support, parallel driving and driven shafts within said housing, said driven shaft projecting from the left hand end of said housing as viewed from the front, a power-transmitting member on the left hand end of said driven shaft to drive the lathe, a motor supported by and beneath said support, driving mechanism connecting said motor to said driving shaft, and a change-speed mechanism within said housing to connect said driving shaft to said driven shaft.

FREDERICK C. BLANCHARD.